United States Patent [19]

Nakatani et al.

[11] 4,457,008

[45] Jun. 26, 1984

[54] AUTOMATIC RETRIEVAL APPARATUS

[75] Inventors: Keiji Nakatani, Kawasaki; Masaharu Arakaki, Sagamihara, both of Japan

[73] Assignee: Minolta Camera Kabushiki Kaisha, Osaka, Japan

[21] Appl. No.: 269,655

[22] Filed: Jun. 2, 1981

[30] Foreign Application Priority Data

Jun. 14, 1980 [JP] Japan ................. 55-80639

[51] Int. Cl.$^3$ ............................................. G03B 23/12
[52] U.S. Cl. .......................................... 377/18; 377/53; 353/26 A; 355/41; 250/557
[58] Field of Search ...................... 377/17-19, 377/53; 364/200, 900, 431.11; 360/72.1, 72.2; 250/557, 570; 353/26 A; 355/41

[56] References Cited

U.S. PATENT DOCUMENTS

| | | | |
|---|---|---|---|
| 3,751,639 | 8/1973 | Searle et al. | 250/557 |
| 3,895,865 | 7/1975 | Kaufman et al. | 353/26 A |
| 3,919,560 | 11/1975 | Nopper | 250/557 |
| 3,937,927 | 2/1976 | Weigert | 377/18 |
| 3,958,874 | 5/1976 | Uchida et al. | 353/26 A |
| 3,982,107 | 9/1976 | Butler | 377/53 |
| 3,992,092 | 11/1976 | Place | 355/41 |
| 3,999,846 | 12/1976 | Sone et al. | 353/26 A |
| 4,043,652 | 8/1977 | Mickelson | 250/557 |
| 4,068,934 | 1/1978 | Tanaka et al. | 353/26 A |
| 4,197,451 | 4/1980 | Dyer et al. | 377/19 |
| 4,229,793 | 10/1980 | Yoshida et al. | 364/431.11 |

Primary Examiner—Gary Chin
Attorney, Agent, or Firm—Wenderoth, Lind & Ponack

[57] ABSTRACT

An automatic retrieval apparatus for use with an information containing film in a roll form, arranged to control driving of the information containing film by reading document marks or blips provided in the information containing film to correspond with respective frames. The retrieval apparatus includes a detecting circuitry for detecting the document marks to produce detecting signal, a latch circuitry to be set by impression of the detecting signal to it, and a calculation processing circuitry which effects predetermined calculation corresponding to the detection of the document marks when the latch circuitry is in the set state, and which produces signal for resetting the latch circuitry upon completion of the calculation processing.

4 Claims, 15 Drawing Figures

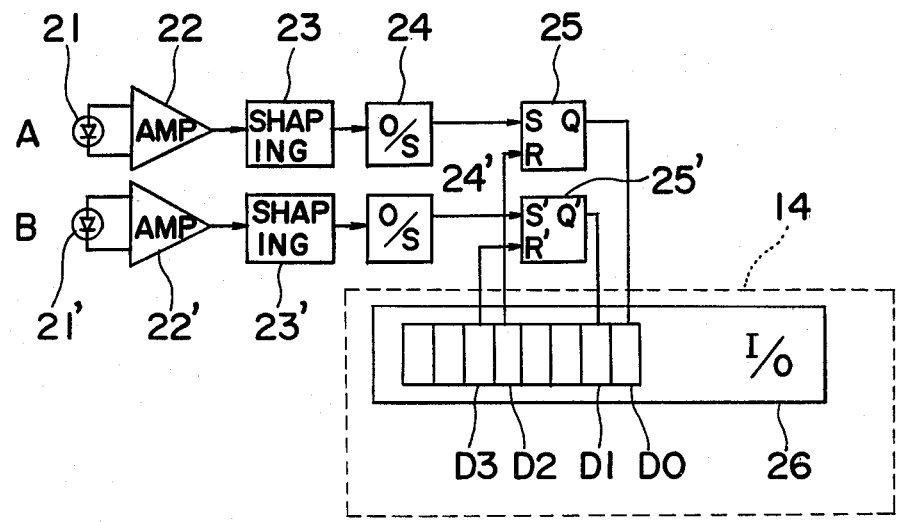
Fig. 5
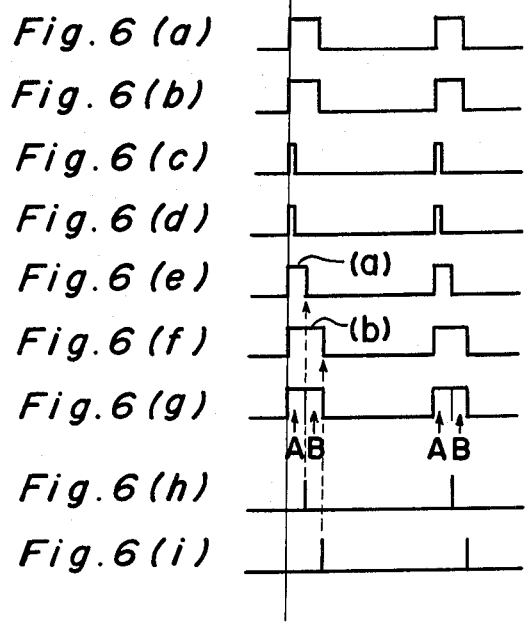
Fig. 6(a)
Fig. 6(b)
Fig. 6(c)
Fig. 6(d)
Fig. 6(e)
Fig. 6(f)
Fig. 6(g)
Fig. 6(h)
Fig. 6(i)
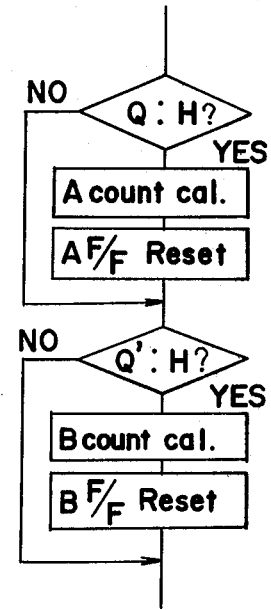
Fig. 7

AUTOMATIC RETRIEVAL APPARATUS

BACKGROUND OF THE INVENTION

The present invention generally relates to an information retrieval apparatus and more particularly, to an automatic retrieval apparatus for films containing information therein such as microfilms and the like.

Commonly, for the automatic retrieval of a microfilm in a roll form, count marks generally referred to as document marks or blips are provided in positions corresponding to respective frames of the microfilm so as to retrieve required frames by counting said document marks.

The microfilms of the above described type are broadly divided into a one channel type in which a plurality of frames 2-1, 2-2, 2-3, and . . . 2-n are aligned in one row on a microfilm 1, with document marks 3-1, 3-2, 3-3, and . . . 3-n being provided between the respective frames and one side edge of the microfilm 1 as shown in FIG. 1, and into a two channel type in which frames 4-1, 4-2, 4-3, and . . . 4-n, and 5-1, 5-2, 5-3, and . . . 5-n are respectively provided in two rows as shown in FIG. 2 to provide a lower channel or A channel and an upper channel or B channel, while document marks 6-1, 6-2, 6-3, and . . . 6-n, and 7-1, 7-2, 7-3, and . . . 7-n are provided between one edge of the microfilm 1' and the respective frames 5-1, 5-2, 5-3, and . . . 5-n for the channel A and also between the other edge thereof and the respective frames 4-1, 4-2, 4-3, and . . . 4-n for the channel B so as to effect independent retrieval for each channel or simultaneous retrieval for both channels. Depending on requirements, some microfilms have an interval or pitch between the respective frames reduced or narrowed as shown in FIG. 2. Meanwhile, the automatic retrieval system utilizing the microfilms as described above has made a rapid progress recently, with the retrieving speed thereof being increased still further, and it is noted that the increased retrieving speed, together with the size of the document marks, has an important bearing on the count operation or the calculation processing time in terms of the control circuitry therefor. On the other hand, following the development of the electronic industry, micro-computers have been put into actual applications for utilization thereof in the automatic retrieval field. In the case as described above, since the program is processed in a serial manner with respect to time, it is necessary to pay attention to the processing time as stated above, with the necessity thereof increasing still more with respect to the document marks for two channels whose width is small as shown in FIG. 2.

FIG. 3 shows a block diagram representing one example of a conventional count processing circuit for document marks employing a micro-computer; upon the projection of light 10 onto the document marks 3 of the microfilm 1, the transmitted light which varies in its intensity is applied to a photosensing element 11, and the electric signal from the photoelectric conversion by the element 11 is amplified by an operational amplifier 12 whose input terminals are connected to the photosensing element 11 and whose output terminal is coupled to a waveform shaping circuit 13; the signal, after being subjected to shaping in the circuit 13, is fed into the micro-computer 14 for counting, calculation, judgement, etc. The micro-computer 14 further includes a central processing unit CPU which is coupled to a read only memory ROM in which programs are stored for sequentially processing counting, calculation, judgement, etc., a random access memory RAM for temporarily storing the information during execution of the programs, and input and output interface I/O which is coupled to the waveform shaping circuit 13, a motor rotational direction detecting circuit 15, a motor drive control circuit 16 and an external motor M, etc. for controlling inputs and outputs of external control sections. The micro-computer 14 also includes an address decoder AD for selecting each of the sections. A key section 18 is also connected to the input and output interface I/O for keying-in the required frames or numbers, and a displaying section 19 is connected to interface I/O for the indication thereof.

The signal subjected to the waveform shaping is passed through the input and output interface I/O so as to be used as a count signal by the program stored in the micro-computer 14, and after the count calculation is performed in the micro-computer 14, the count signal is applied, through the input and output interface I/O, to the motor rotational direction detecting circuit 15 and to the motor drive control circuit 16 in the form of a motor running and stopping signal 17 which also serves as a motor stopping timing signal.

Reference is also made to FIG. 4 showing a time chart related to the count calcuation in the microfilm retrieval apparatus employing the micro-computer as described above. Generally, edge portions (i.e. rising or falling portions) of the photoelectric signal are adopted for count timing, and the micro-computer 14 detects the variation thereof and enters the count and calculation program routine. In the process described above, even when variation of the document marks for the channel B takes place during the same period of time or during a count calculation of the document marks for the channel A, it can not be read due to the overlapping shown by the dotted lines in FIG. 4. Therefore, it becomes necessary to positionally displace the document marks themselves or the photosensing element itself with respect to the running direction of the film by an amount equivalent to the time period required for calculating the signal of the document marks for the channel A and the signal of the document marks for the channel B. Alternatively, there may be employed another method in which a counter is provided in each of the A and B channels for supplying an output thereof to the micro-computer. The conventional arrangements as described above, however, have disadvantages in that the former is not suitable for general purposes, with requirements for positional adjustments, while the latter invites complications in the construction of the apparatus, with a consequent increase in its cost.

SUMMARY OF THE INVENTION

Accordingly, an essential object of the present invention is to provide an automatic retrieval apparatus for microfilms and the like based on a novel count calcuation process in which a variation of the document marks is detected and temporarily stored or latched, while upon completion of the calculation processing by the micro-computer, said temporary storage or latching is cancelled.

Another important object of the present invention is to provide an automatic retrival apparatus of the above described type which is simple in construction and stable in functioning at a high reliability, and can be readily manufactured on a large scale at a low cost.

In accomplishing these and other objects, according to one preferred embodiment of the present invention, there is provided an automatic retrieval apparatus for use with an information containing film in a roll form, and arranged to control driving of the information containing film by reading document marks or blips provided in the information containing film to correspond with respective frames thereof. The retrieval apparatus includes detecting means for detecting the document marks so as to produce a detecting signal, a latch means to be set by input thereto of the detecting signal, and a calculation processing means which effects a predetermined calculation corresponding to the detection of the document marks when the latch means is in its set state, and which produces a signal for resetting the latch means upon the completion of the calculation processing.

By the arrangement according to the present invention as described above, an improved automatic retrieval apparatus suitable for general purposes has been advantageously presented through a simple construction and at a low cost with the substantial elimination of the disadvantages inherent in the conventional arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which;

FIG. 5 is an electrical block diagram of a microfilm automatic retrieval apparatus for document mark counting according to one preferred embodiment of the present invention;

FIGS. 6(a) to 6(i) are waveform diagrams explanatory of the functions of the circuit of FIG. 5; and FIG. 7 is a flow chart illustrating the functions of essential portions of the circuit of FIG. 5.

Before the description of the present invention proceeds, it is to be noted that like parts are designated by like reference numerals throughout several views of the accompanying drawings.

DETAILED DESCRIPTION OF THE INVENTION

Figure 3:
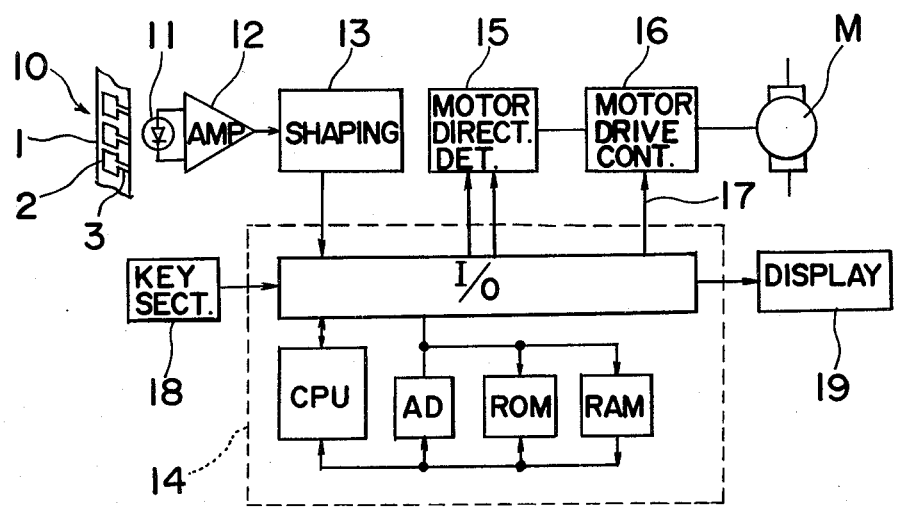
FIG. 3 is an electrical block diagram showing one example of a conventional count processing circuit of document marks (already referred to)
Figure 4:
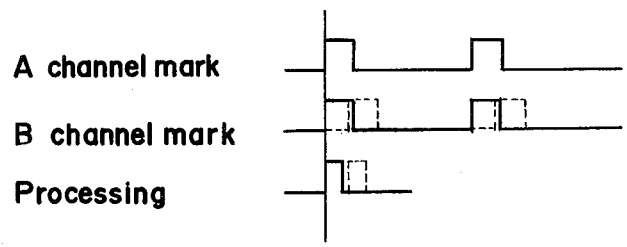
FIG. 4 is a diagram explanatory of the disadvantages inherent in the conventional circuit of FIG. 3 (already referred to)

Referring now to the drawings, there is shown in FIG. 5 an electrical block diagram of a microfilm automatic retrieval apparatus for document mark counting according to one preferred embodiment of the present invention, which generally includes photosensing elements 21 and 21' which are respectively for the channels A and B and which are coupled, through operational amplifiers 22 and 22', and waveform shaping circuits 23 and 23' to corresponding monostable multivibrators 24 and 24' whose outputs are connected to set terminals S and S' of RS flip-flops 25 and 25'. The outputs Q and Q' of the RS flip-flops 25 and 25' are supplied to the micro-computer 14, which a similar arrangement to that shown in FIG. 3 and whose detailed description is abbreviated here for brevity, with only the I/O port 26 thereof schematically shown as surrounded by dotted lines in FIG. 5. Meanwhile, reset terminals R and R' of the flip-flops 25 and 25' are respectively connected to ports D2 and D3 of the I/O port 26 of the micro-computer 14 in such a manner as to receive the outputs from the micro-computer 14 for resetting of the flip-flop 25 and 25'.

Referring also to the waveform diagrams of FIGS. 6(a) to 6(i), and a flow-chart of FIG. 7, by the above arrangement, upon the respective input of document mark detection signals for channels A and B to ports D0 and D1 of the I/O port 26 from the output terminals Q and Q' of the RS flip-flops 24 and 25', a counting calculation is effected within the micro-computer 14, and when the count processing routine by the microcomputer 14 has been completed, reset signals are applied separately to the respective channels A and B from the ports D2 and D3 of the I/O port 26.

Figure 1:
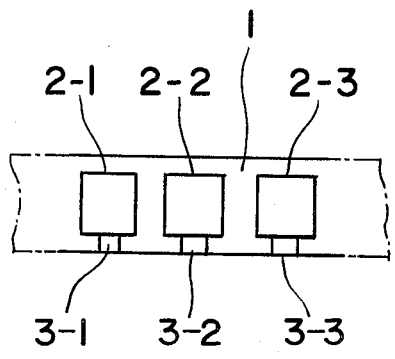
FIG. 1 and FIG. 2 are fragmentary top plan views illustrating the relationship between frames and document marks of microfilms (already referred to)
Figure 2:
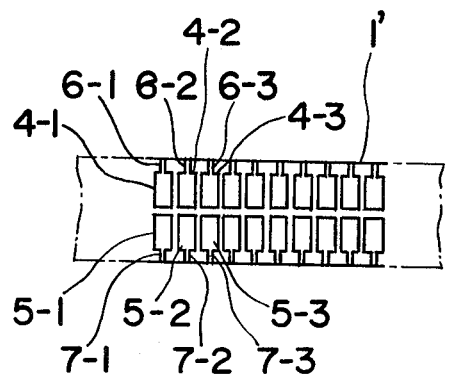

On the assumption that one of the document marks 6-X for the channel A (FIG. 2) confronts the photosensing element 21, said element 21 produces pulses as shown in FIG. 6(a), which are transformed into pulses as shown in FIG. 6(c) by the monostable multivibrator 24, and input to the set terminal S of the flip-flop 25 for setting said flip-flop 25. The set signal (FIG. 6(e)) from the output Q of the flip-flop 24 is supplied to the port D0 of the I/O port 26 so as to be input to a counter (not shown) for effecting the counting of the document marks, and, upon the completion of the count processing routine for the channel A, a reset signal (FIG. 6(h)) is supplied to the port D2 of the I/O port 26, and this reset signal is also supplied to the reset terminal R of the flip-flop 25 so as to reset said flip-flop 25 and to prepare it for the arrival of the subsequent document mark.

Meanwhile, when one of the document marks 7-X for the channel B (FIG. 2) faces the photosensing element 21', said photosensing element 21' produces pulses as shown in FIG. 6(b), which are transformed, by the monostable multivibrator 24', into pulses as shown in FIG. 6(d), and are supplied to the set terminal S' of the flip-flop 25' so as to set said flip-flop 25'. The set signal (FIG. 6(f)) from the output Q' of the flip-flop 25' is input to the port D1 of the I/O port 26 for counting the document marks, and upon the completion of the count processing routine for the channel B, a reset signal (FIG. 6(i)) is supplied to the port D3 of the I/O port 26 and to the reset terminal R' of the flip-flop 25' so as to reset said flip-flop 25' and to prepare it for the arrival of the subsequent document mark.

Accordingly, even when the signals representing the document marks for the channel A and channel B are simultaneously produced (FIG. 6(g)), the document mark signals are stored or latched in the flip-flops 25 and 25' according to the respective channels, and the signal for the flip-flop 25' is counted after completion of the count processing routine for the channel A (FIGS. 6(e) and 6(f) for differentiation of the processing timing, and therefore, the counting of the document marks is positively effected according to each channel.

It is to be noted that, in FIGS. 6(e) and 6(f), the calculation processing for the channel A is indicated at (a), and that for the channel B, at (b), with the timing for the processing being differentiated therebetween, although the flip-flop 25 and 25' are set simultaneously.

As is clear from the foregoing description that, according to the arrangement of the present invention, it is possible to effect accurate reading, even when document marks for a plurality of channels are to be read by the use of the micro-computer, and moreover, since it is not necessary to provide a separate counter for each channel, the construction of the apparatus is appreciably simplified.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An automatic retrieval apparatus for use with an information containing film in a roll form, arranged to control driving of said information containing film by reading marks provided in said information containing film so as to correspond to respective frames thereof, said retrieval apparatus comprising a plurality of detecting means corresponding to a plurality of channels for detecting said marks so as to produce a plurality of detecting signals, a plurality of latch means which are respectively set by the corresponding detecting signals, a calculation processing means which effects a predetermined calculation corresponding to the detecting of said marks when one of said plurality of latch means is in its set state and which produces a signal for resetting said one latch means upon completion of the calculation processing, said calculation processing means further being arranged to effect said predetermined calculation in a sequential order when said plurality of latch means are being set simultaneously by said detecting signals by resetting the first latch means after the calculation corresponding to the first channel is completed and executing the calculation corresponding to the next channel following setting of the next one of said plurality of latch means.

2. An automatic retrieval apparatus as claimed in clain 1, wherein said marks are provided so as to correspond to respective frames of said roll film, and wherein said calculation is a count calculation following the detection of said marks.

3. An automatic retrieval apparatus as claimed in claim 1, wherein said calculation processing means is constituted by a micro-computer which executes the calculation according to programs stored in a memory unit.

4. An automatic retrieval apparatus as claimed in claim 3, wherein said latch means which is set by said detecting signal and reset upon completion of the calculation is constituted by flip-flops provided outside said micro-computer.

* * * * *